United States Patent
Born et al.

(10) Patent No.: US 10,885,193 B2
(45) Date of Patent: Jan. 5, 2021

(54) METHOD AND SYSTEM FOR PERSISTING UNTRUSTED FILES

(71) Applicant: Microsoft Technology Licensing, LLC, Redmond, WA (US)

(72) Inventors: Bryan R. Born, Redmond, WA (US); Giridhar Viswanathan, Redmond, WA (US); Peteris Ledins, Kirkland, WA (US); Balaji Balasubramanyan, Redmond, WA (US); Margarit Simeonov Chenchev, Sammamish, WA (US); Benjamin M. Schultz, Bellevue, WA (US); Hari R. Pulapaka, Redmond, WA (US); Frederick Justus Smith, Redmond, WA (US); Narasimhan Ramasubramanian, Redmond, WA (US); Raphael Gianotti Serrano Dos Santo, Redmond, WA (US); Nived Kalappuraikal Sivadas, Seattle, WA (US); Ravinder Thind, Sammamish, WA (US); Matthew David Kurjanowicz, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 15/894,745

(22) Filed: Feb. 12, 2018

(65) Prior Publication Data
US 2019/0180033 A1   Jun. 13, 2019

Related U.S. Application Data

(60) Provisional application No. 62/596,033, filed on Dec. 7, 2017.

(51) Int. Cl.
*G06F 21/00* (2013.01)
*G06F 21/57* (2013.01)
(Continued)

(52) U.S. Cl.
CPC .............. *G06F 21/57* (2013.01); *G06F 16/16* (2019.01); *G06F 21/53* (2013.01); *G06F 21/6209* (2013.01); *G06F 2221/2113* (2013.01)

(58) Field of Classification Search
None
See application file for complete search history.

(56) References Cited

U.S. PATENT DOCUMENTS 5,579,222 A      11/1996  Bains et al.
9,143,530 B2 *    9/2015  Qureshi .................. G06F 21/12
(Continued)

FOREIGN PATENT DOCUMENTS

EP       2782038 A1     9/2014

OTHER PUBLICATIONS

Huchton, Scott et al. Building and Evaluating a k-Resilient Mobile Distributed File System Resistant to Device Compromise. Milcom 2011 Military Communications Conference. https://ieeexplore.ieee.org/stamp/stamp.jsp?tp=&arnumber=6127484 (Year: 2011).*

(Continued)

*Primary Examiner* — Jeremiah L Avery
(74) *Attorney, Agent, or Firm* — Liang IP, PLLC

(57) ABSTRACT

Securely performing file operations. A method includes determining a trust characteristic assigned to a file. When the trust characteristic assigned to the file meets or exceeds a predetermined trust condition, then the method includes performing a file operation on the file in a host operating system while preventing the file operation from being performed in the container operating system. When the trust characteristic assigned to the file does not meet or exceed the predetermined trust condition, then the method includes performing the file operation on the file in the container operating system while preventing the file operation from being performed directly in the host operating system.

20 Claims, 12 Drawing Sheets

(51) Int. Cl.
*G06F 21/62* (2013.01)
*G06F 16/16* (2019.01)
*G06F 21/53* (2013.01)

(56) References Cited

U.S. PATENT DOCUMENTS

| | | | |
|---|---|---|---|
| 9,152,790 | B1 | 10/2015 | Glick et al. |
| 2002/0194010 | A1 | 12/2002 | Bergler et al. |
| 2004/0010440 | A1 | 1/2004 | Lenard et al. |
| 2004/0123117 | A1 | 6/2004 | Berger |
| 2005/0257265 | A1* | 11/2005 | Cook ............... H04L 63/1441 726/23 |
| 2005/0257266 | A1* | 11/2005 | Cook ............... H04L 63/1441 726/23 |
| 2006/0004667 | A1 | 1/2006 | Neil |
| 2006/0294102 | A1* | 12/2006 | Reddish ............... G06F 21/53 |
| 2007/0180509 | A1* | 8/2007 | Swartz ............... G06F 9/4406 726/9 |
| 2009/0165133 | A1 | 6/2009 | Hwang et al. |
| 2010/0175104 | A1 | 7/2010 | Khalid |
| 2010/0332401 | A1* | 12/2010 | Prahlad ............... G06F 3/0649 705/80 |
| 2011/0072274 | A1 | 3/2011 | Leoutsarakos et al. |
| 2011/0145926 | A1 | 6/2011 | Dalcher et al. |
| 2013/0055401 | A1 | 2/2013 | Kim et al. |
| 2014/0020113 | A1 | 1/2014 | Shah et al. |
| 2014/0040979 | A1* | 2/2014 | Barton ............... G06F 21/604 726/1 |
| 2014/0282890 | A1 | 9/2014 | Li et al. |
| 2015/0040182 | A1 | 2/2015 | Chambers et al. |
| 2015/0121536 | A1 | 4/2015 | Xing et al. |
| 2015/0143374 | A1 | 5/2015 | Banga et al. |
| 2015/0163206 | A1* | 6/2015 | McCarthy ............... G06F 21/10 713/171 |
| 2015/0310188 | A1* | 10/2015 | Ford ............... H04L 63/0428 726/28 |
| 2016/0188909 | A1 | 6/2016 | Zatko et al. |
| 2017/0041296 | A1* | 2/2017 | Ford ............... H04L 63/0421 |
| 2017/0163654 | A1 | 6/2017 | Peppe et al. |
| 2017/0223024 | A1 | 8/2017 | Desai et al. |
| 2018/0262509 | A1 | 9/2018 | Li et al. |
| 2018/0293394 | A1 | 10/2018 | Gunda et al. |
| 2018/0307812 | A1 | 10/2018 | Boldin |
| 2018/0349576 | A1 | 12/2018 | Dasgupta et al. |
| 2019/0347420 | A1 | 11/2019 | Schultz et al. |

OTHER PUBLICATIONS

Ko, Ryan K L et al. Flogger: A File-centric Logger for Monitoring File Access and Transfers within Cloud Computing Environments. 2011 IEEE 10th International Conference on Trust, Security and Privacy in Computing and Communications. https://ieeexplore.ieee.org/stamp/stamp.jsp?tp=&arnumber=6120893 (Year: 2011).*

Liu, Yichun; Liu, Huafu. Trust-based Dynamic Access Control Model for P2P Network. 2006 International Conference on Communications, Circuits and Systems. https://ieeexplore.ieee.org/stamp/stamp.jsp?tp=&arnumber=4064191 (Year: 2006).*

Li, Ninghui et al. Usable Mandatory Integrity Protection for Operating Systems. 2007 IEEE Symposium on Security and Privacy (SP '07). https://ieeexplore.ieee.org/stamp/stamp.jsp?tp=&arnumber=4223222 (Year: 2007).*

Goldman, Aaron D et al. Cryptographically-Curated File System (CCFS): Secure, inter-operable, and easily implementable Information-Centric Networking. 39th Annual IEEE Conference on Local Computer Networks. https://ieeexplore.ieee.org/stamp/stamp.jsp?tp=&arnumber=6925766 (Year: 2014).*

"International Search Report and Written Opinion Issued in PCT Application No. PCT/US2018/062378", dated Jan. 30, 2019, 11 Pages.

"International Search Report and Written Opinion Issued in PCT Application No. PCT/US2018/062379", dated Jan. 30, 2019, 11 Pages.

"Mark of the Web", Retrieved from: https://blogs.msdn.microsoft.com/ie/2005/03/07/mark-of-the-web/, Mar. 7, 2005, 15 Pages.

"Access control list", Retrieved from: https://en.wikipedia.org/wiki/Access_control_list, Retrieved date: Nov. 21, 2017, 3 Pages.

"Non Final Office Action Issued in U.S. Appl. No. 15/977,680", dated Feb. 27, 2020, 31 Pages.

"Non Final Office Action Issued in U.S. Appl. No. 16/015,064", dated Apr. 7, 2020, 31 Pages.

"International Search Report and Written Opinion Issued in PCT Application No. PCT/US19/030509", dated Jun. 27, 2019, 13 Pages.

Wen, et al., "A Survey of Virtualization Technologies Focusing on Untrusted Code Execution", in Proceedings of the 6th International Conference on Innovative Mobile and Internet Services in Ubiquitous Computing, Jul. 4, 2012, pp. 378-383.

"Final Office Action issued in U.S. Appl. No. 15/977,680", dated Jul. 14, 2020, 23 Pages.

"Final Office Action Issued in U.S. Appl. No. 16/015,064", dated Sep. 11, 2020, 34 Pages.

* cited by examiner

METHOD AND SYSTEM FOR PERSISTING UNTRUSTED FILES

CROSS-REFERENCE TO RELATED APPLICATIONS

This application claims the benefit of and priority to U.S. Provisional Patent Application Ser. No. 62/596,033 filed on Dec. 7, 2017 and entitled "Method and System for Persisting Untrusted Files," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Virtual machine-based virtualization provides many of the isolation benefits of physical machines while offering flexibility and density. Container-based virtualization provides a lighter weight virtualization environment, improved compatibility, and lower operational costs. In a containerized based configuration approach, various hierarchical configuration layers are used to configure entities such as containerized operating systems. Additionally, filters can be applied to configuration layers to accomplish the desired configuration for an entity. In particular, an entity, such as a container operating system kernel, can have different portions of different configuration layers exposed to it from a host operating system such that configuration from different configuration layers can be used to configure the containerized entity, but where the containerized entity operates as if it is running in its own pristine environment, even though it is using physical elements from the host operating system. Thus, a given configuration layer could be used as part of a configuration for multiple different containerized entities thus economizing storage, network, and compute resources by multi-purposing them for different container operating systems.

As intimated above, containers achieve their lightweight attributes through sharing aspects of the host operating system. This may include sharing of files and folders, sharing configuration, sharing devices, and sharing operating system services (sometimes referred to as daemons). In some environments, such as friendly multi-tenant hosting, systems may de-duplicate overlapping processes, enabling even more efficient resource utilization. Operating system services are a contributor to process overlap.

Lately, container technology has gained significant popularity. Developers and IT administrators are attracted to the benefits of containers, including software isolation and software compatibility. As containers are inexpensive to create and destroy, their lifecycle in some scenarios is much shorter than a typical operating system. Despite the benefits listed above, a common problem that many applications need to solve when running in a container environment is how to persist untrusted files and state for a container without the fear of repercussions on the host. This should be accomplished in a manner that is consistent with the expected user experience (UX).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing system comprising a host operating system and a container operating system operating in the host operating system. The method includes acts for securely performing file operations. The method includes determining a trust characteristic assigned to a file. When the trust characteristic assigned to the file meets or exceeds a predetermined trust condition, then the method includes performing a file operation on the file in the host operating system while preventing the file operation from being performed in the container operating system. When the trust characteristic assigned to the file does not meet or exceed the predetermined trust condition, then the method includes performing the file operation on the file in the container operating system while preventing the file operation from being performed directly in the host operating system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 12 FIG. 8 illustrates another method for causing a file to be copied safely.

DETAILED DESCRIPTION

Figure 1:
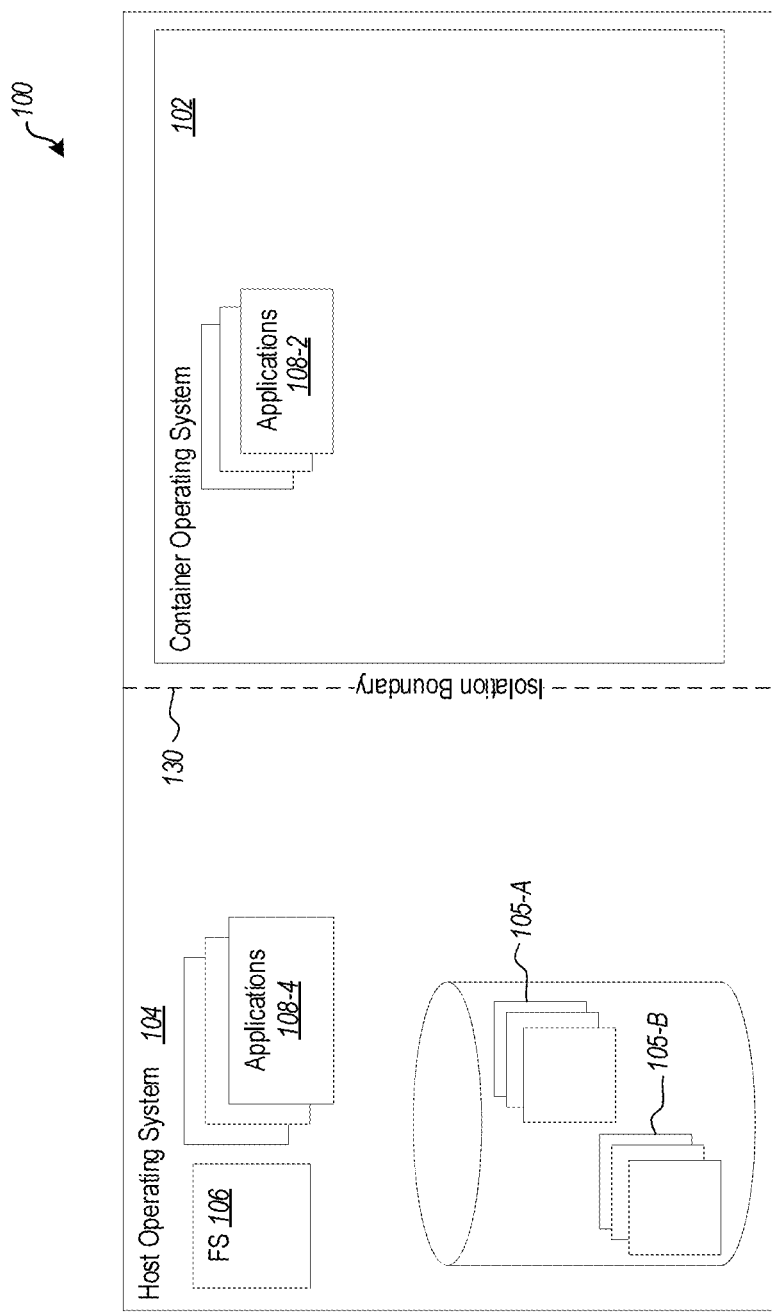
FIG. 1 illustrates a computing system having a host operating system and a container operating system configured to open untrusted files in the container operating system.

To implement desired user experience scenarios, users need to download, persist, share, and open untrusted files and app state. Users and apps expect seamless access to files that transcends isolation barriers that are imposed for security. However, security requires the system to enforce and track files and only allow access in specific circumstances. Embodiments illustrated herein may be implemented to facilitate both compatibility and security.

For example, various embodiments of the invention may implement one or more of the following features:

A secure environment in which to run apps and open files.

A mechanism to determine what files are "safe" and "not safe".

A mechanism to classify and track files by type and location.

A mechanism to manage and configure file settings and classifications.

A mechanism to quarantine unsafe files.

A mechanism to cleanse files that are not safe.

A mechanism to manage the policies of persisting the types of files and the how to handle different types of the files.

A mechanism to control which persisted files are exposed into a container.

Embodiments may be further configured to allow for various security technologies (either existing or custom-made enhancements intended to be used directly with embodiments of the invention) to be used in context with embodiments of the invention. In particular, embodiments of the invention can add an additional layer of security to existing protections or newly enabled protections. For example, the following illustrates a number of example technologies that can be used with embodiments of the invention for enhanced security for containerized operating systems.

Thus, embodiments illustrated herein implement an improved computing system which provides improved security and malware protection over previous computing systems.

Note that the embodiments below illustrate the secure computing system in the context of a host operating system and one or more container operating systems. In the examples below, it is generally assumed that the host operating system is a 'secure' operating system where only trusted files are opened and that the container operating system is an 'insecure' operating system where untrusted files can be opened. However, it should be appreciated that embodiments of the invention contemplate other scenarios. For example, there are scenarios in which the inverse is assumed, e.g. a 'secure container' running on an 'insecure' host. Thus, the examples below should not be read to limit secure operating systems to host operating systems and insecure operating systems to containerized or virtual operating systems operating on those host operating systems.

Note that secure and insecure are relative terms. That is, a secure operating system is more secure than an insecure operating system, which is less secure than the secure operating system.

Mark of the Web (MOTW)

The Mark of the Web (MOTW) is a feature of the Edge and Windows Internet Explorer web browsers available from Microsoft Corporation of Redmond, Wash. that enhances security. MOTW enables Edge and Internet Explorer to force webpages to run in the security zone of the location the page was saved from, as long as that security zone is more restrictive than the Local Machine zone, instead of the Local Machine zone. Because the Local Machine zone has so few security restrictions, active HTML documents running on the local machine have access to the computer's entire file system. The MOTW helps Internet Explorer protect the user from the risks of running these documents in the Local Machine zone. By referencing the MOTW, Internet Explorer can force these webpages into a zone that has more restrictions, such as the Internet zone. While MOTW provides a method of file classification, it doesn't provide a method to track files. Some embodiments may use MOTW or similar methods to glean additional information about a file and/or assess a file's level of trust.

File Marking/Tagging/Access Control Lists (ACLs)

File System flags/tags/ACLs can be used to persist a file's level of trust. As will be illustrated in more detail below, this marking can be used to determine where a file can have various actions, such as open, copy and/or save, performed on them. This may be performed by having metadata in a header of the file, an accompanying metadata file for a file, in an access control list, or by other appropriate means.

Note that some embodiments may have different and/or additional methods for persisting a file's level of trust. In one embodiment, a database or ledger tracks a file and stores the metadata in a cache on the host operating system. In another embodiment, this is tracked by a management service that may reside on the host operating system or on a remote computer that monitors the host operating system. Files may be uniquely identified by a set of known characteristics including filename, folder name, most recent saved date, file size, file checksum, file cyclical redundancy check, file location on disk, disk hardware unique identifiers, user identity who created/last modified the file, app that created/last modified the file, server or resource from which the file originated, etc. The location (database, ledger, management service, etc.) that stores a file's level of trust then monitors (and enforces) filesystem transactions on one or more host operating systems. In some embodiments this is tightly integrated into one or more filesystems. In other embodiments this is implemented as a set of filesystem extensions such as plug-ins and/or filters.

Encryption of Untrusted Files.

In some embodiments, isolated files are encrypted. From security standpoint, file encryption is a preferred method because it keeps any malware inert until a file is decrypted. This prevents a user and/or an application on the host, for example, from accidently opening an untrusted file in a trusted environment.

File System Filter Driver

Because encryption of untrusted files makes sharing such files with other systems difficult, another alternative is to keep the file unencrypted but prevent access on the host by using a file system filter driver. Access would only be allowed from an isolated container operating system or by known executables that have been modified to access these files securely by not processing their content (for example, the Windows Shell).

Embodiments illustrated herein include functionality for persisting untrusted files across different execution environments. As noted above, this functionality may be used in combination with other security techniques.

The present disclosure includes information directed to the configuration, policy and enforcement mechanisms to implement such an environment, protecting the configuration and policy from tampering, and protecting the runtime from running unwanted executables. These executables may be injected from an outside source (e.g. a set of installation software on the host, or an enterprise administrator). Alternatively or additionally, these executables may be injected from an inside source (e.g. a set of installation software that runs in the tailored runtime, or a user).

For example, one embodiment may include a secure system for persisting untrusted files to the host file system. This secure system may have a number of other features.

For example, the secure system may use a combination of file system metadata/ACLs and encryption and access controls. It may additionally or alternatively track files using other identifiers and store data about the files in a separate location.

Alternatively or additionally, the secure system may be configured to process file open requests for untrusted files in a secure isolated execution environment. For example, an isolated execution environment may be a container operating system, a virtual machine, an emulated runtime, or other isolated environment. Examples of isolated environments herein are sometimes referred to simply as a container or a guest. When the examples illustrated below show use of a container operating system, it should be appreciated that other types of isolated operating systems may be used, alternatively or additionally.

In some embodiments the secure system may include enhanced features to an operating system or file access mechanism, such as including targeted enlightenment of certain applications. As will be illustrated in more detail below, applications can be enlightened to identify which files are trusted or not. In some embodiments, this may be accomplished by the applications being able to access file metadata, such as the headers, metadata files, ACLs, etc., described above. In some embodiments, files may be tracked by the host operating system, which will then launch the appropriate container and application to enable file access. Alternatively or additionally the host operating system will provide a notification mechanism to the applications.

In some embodiments, the secure system may be configured to intercept an "open" command (or other commands, such as create, write, copy, etc.) for files. For untrusted files the user will be presented with options to abort or open the file in a secure isolated execution environment. Alternately, the file is directly opened in the secure isolated execution environment without requiring user choice. Trusted files can be opened on the host portion (i.e., a host operating system, sometimes referred to simply as a host) of the secure system. To accomplish this functionality, some embodiments of the secure system may further include an application programming interface (API) that probes the trust state of a file, such as by accessing file metadata. Alternatively or additionally, some embodiments of the secure system may further include an API such that applications and other software components can mark files untrusted (or alternatively or additionally as trusted).

Some embodiments of the secure system may include functionality that automatically marks files as trusted and untrusted. In one scenario, a trust attribute may be configurable via enterprise policy and tracked as a part of file origin. For example, an enterprise user may download a document from a corporate server. This server may be identified by attributes such as location attributes (e.g. an IP address or URL), security attributes (e.g. an X.509 certificate or directory service listing such as active directory), etc. If this server and its identity are a part of the enterprise policy, the document the user downloads from it will automatically be marked as trusted. In this same scenario, any file that originates from an untrusted source (e.g. a server, a removeable storage device, etc.) will be automatically marked as untrusted. Alternatively or additionally the file, once downloaded from a source may be examined by diagnostic software (such as anti-virus, anti-malware, etc.) and trust level may be determined as a result. In some embodiments there may be multiple levels of trust. For example, if a file is from a known enterprise server and passes security inspection, it may be at the highest level of trust. If a file is from an unknown server and passes security inspection, it may have a middle level of trust. If a file fails security inspection, it may be untrusted. There are other additional or alternate mechanisms to assess a file for trust such as digital signatures, application identities, user identities, etc. In one embodiment, user A may send a file to user B. User B (or a software component on behalf of user B) does a background check via a $3^{rd}$ party service to determine the trust level before opening the file from user A.

In some embodiments, when a trust level is applied to an archived (typically compressed) collection of one or more files, e.g., .zip files, .cab files, etc., extracting files from inside the archived collection preserves the trust level on all extracted files. Thus, for example if the archived file itself has a lower trust level, any files extracted from that archived file will have the same lower trust level automatically applied.

Similarly, when one or more files are combined into a single archived file, the generated archived file preserves the lowest trust marking of its constituent files. Some embodiments will optionally disallow creation of such an archive file with a mix of files with different levels of trust marking.

Some embodiments of the secure system may include functionality that allows toggling of the trust attribute of a file. For example, as will be illustrated in more detail below, some embodiments may include user interface elements, such as right-click context menus, or other user interface elements, that allow users to toggle a trust attribute of a file from trusted to untrusted and vice-versa.

Some embodiments of the secure system may include functionality to save untrusted files from the guest to the host without caching data in the guest. In the guest, when a user or application saves a file, one or more folders on the host operating system is available to save the file. For security, the system calls to access the host filesystem may be restricted (e.g. via ACLs or other methods). These folder locations may not be accessible to a user or application on the host, or in some embodiments, the files are automatically encrypted or altered so they can not be opened on the host.

Some embodiments of the secure system may include functionality to save untrusted files from the guest to the host without exposing the host file system to the guest. For example, an interprocess communication (IPC) that does not expose the host file system can be used to communicate file data from the guest to the host, where the host can manage where the file data is stored. For example, embodiments may use sockets, message queues, pipes, shared memory, message passing, etc.

Some embodiments of the secure system may include functionality to save untrusted files from the guest to the host while exposing a limited view of the host file system to the guest to improve the user experience. For example, various filter layers can be used to control which portion of the file system are exposed.

Some embodiments of the secure system may include a monitoring system which monitors file open requests made to files and determines how and where (e.g., in the host or the guest) to open these files. For example, the monitoring system may cause untrusted files to be opened in the guest while preventing such files from being opened on the host, and trusted files to be opened on the host while preventing such files from being opened on the guest.

Some embodiments of the secure system may include an enforcement mechanism that blocks applications from opening trusted files in the guest and/or that blocks applications from opening untrusted files in the host.

In the examples illustrated below, many of the examples are described in the context of various computing systems and components available from Microsoft Corporation of Redmond, Wash. However, it should be appreciated that the principles illustrated herein can be implemented on other computing systems produced and/or marketed by other vendors.

Referring now to FIG. 1, a secure computing system 100 is illustrated. The computing system 100 includes a host operating system 104. The host operating system 104 hosts other container operating systems such as the container operating system 102. Note that while a single container operating system 102 is illustrated, it should be appreciated that typically multiple container operating systems will be implemented on the computing system 100. Indeed much of the usefulness of container operating systems is achieved by leveraging the sharing of resources on the computing system 100.

Trusted files 105-A and untrusted files 105-B reside on the host file system 106. File open requests for these files can originate from different sources; for example, from a file manager application, such as File Explorer available from Microsoft Corporation of Redmond, Wash., from shell commands, from an "open" command from within an application, such as one of the applications 108-4 in the host operating system 104 or 108-2 in the container operating system 102, etc. Embodiments illustrated herein process these requests in a secure isolated execution environment (e.g., a container operating system, such as container operating system 102). One way to achieve this is by enlightening all applications 108 to properly recognize the trust state of the files in the file system 106. Application enlightenment can achieve a more elegant and streamlined user experience. However, it should be appreciated that embodiments do not require application enlightenment with respect to trust state for files, and indeed backward compatibility considerations may necessitate specifically allowing applications not having application enlightenment with respect to trust state for files. A different way to achieve this is for a component of host operating system 104 to intercept the open command. If one of the trusted files 105-A is opened, the filesystem intercept is able to determine this and open it on one of the application 108-4 on the host operating system 104. If one of the untrusted files 105-B is opened, the filesystem intercept is able to determine this and open it on one of the applications 108-2 in the container operating system 102.

In one embodiment, an operating system (OS) and file manager application (such as File Explorer available from Microsoft Corporation of Redmond, Wash.) with targeted enlightenment of certain applications is implemented. Embodiments intercept the "open" command (or other file manipulation commands) and when the open target is an untrusted file the user can be presented with a user interface element, such as a dialog window that provides the option to abort or open the file in a secure isolated execution environment. Furthermore, enlightened applications will be able to signal that a file that they are creating is not trusted. One example of this is when a file is created in a secure isolated execution environment, such as the container operating system 102, and the file is stored on the host file system 106. The application creating the file may have the ability to mark the file as untrusted. Another example is when an email client receives a file and needs to save it to the host file system 106. The email client may have the ability to mark the file as untrusted. This can be done by creating or modifying an attribute of the file.

No matter how trust is marked, some embodiments include an API that probes a file's trust state and enables software components to take appropriate actions. Some embodiments automatically mark known untrusted files as such. Alternatively or additionally, the system could mark files as trusted.

In one particular embodiment, files will be considered untrusted unless they are explicitly marked trusted (although as illustrated below, there is some benefit to having the default be trusted while untrusted files are marked as such). The advantage is that unenlightened applications will be able to inject files onto the host and those files will be automatically opened in a secure isolated environment. The disadvantage is that it is required to enlighten all applications that create files, and/or implement additional heuristics which may be needed in the OS to mark files as trusted. An example of an additional heuristic is diagnostic software that runs in the host and performs an analysis of all files as they are created to determine the trust level.

In another embodiment, in addition to making changes to the OS and file manager application to enlighten them on the correct way to handle such untrusted files, embodiments default to treating unmarked files as trusted. The advantage to this approach is that existing files on the system, placed there by legacy systems prior to deployment of the advanced features illustrated herein, can continue to get the same level of trust that the user is expecting and new content will get marked correctly based on the origin of the content (which will not be available for pre-existing files on the system). Furthermore, in this model, untrusted files will open directly in the secure isolated execution environment and any unapproved host access will be blocked with an access error. In the containerization scenario, this may mean that only those OS elements surfaced to a given container will be able access the untrusted file. Any other OS elements would be blocked from accessing the file, for example, using the aforementioned access error.

Content downloaded from an email client poses another challenge. Some embodiments may be implemented in systems that have markings of distrust that survive an email journey. Those embodiments will function with the trust or distrust markings being used to determine where files will be opened. However, generally content downloaded from an email client will need to be opened in an isolated execution environment.

Figure 2:
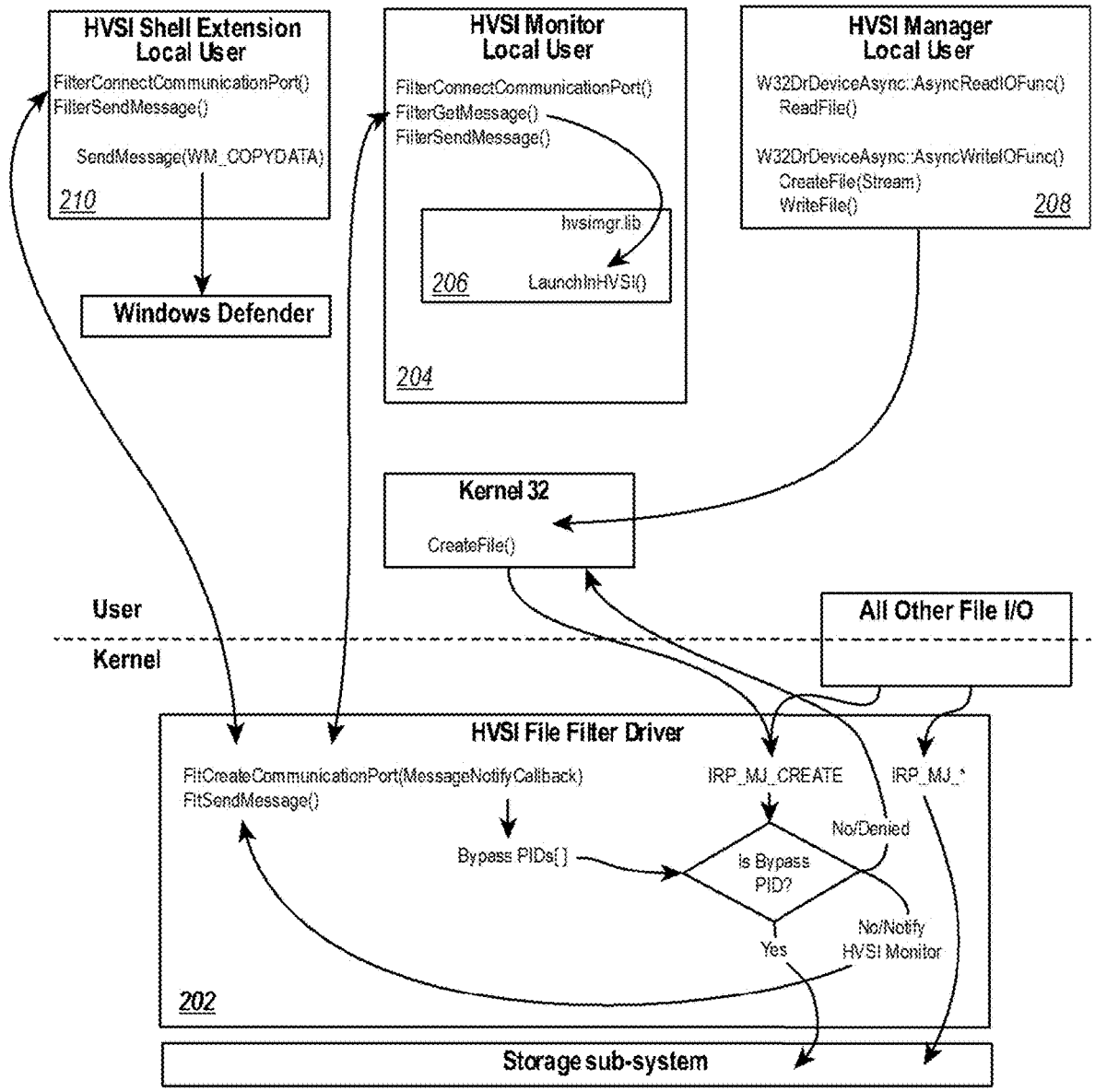
FIG. 2 illustrates interactions between various system components for causing files to be interacted with safely.

Referring now to FIG. 2, some embodiments expose one or more application programming interfaces (APIs) such that applications and other software components can specifically mark files as untrusted.

In FIG. 2, there is an executable that monitors file open requests made to untrusted files. Note that in some embodiments this functionality may be built into the file system or other operating system component. This component communicates with the file filter driver 202 to implement two types of communications:

1) receipt from the file filter driver 202 of messages that contain the pathname of untrusted files that were the target of a CreateFile( ) command; and 2) sending messages to the file filter driver 202 to tell it which process IDs should be able to bypass all I/O intercepts.

File systems and/or file system extensions enable the host operating system 104 and container operating system 102 to efficiently share files. In some cases operating system files are shared to lower the overall disk footprint. However not all files can be shared. In isolation scenarios, the filesystem in host operating system 104 may have additional files and/or different files than container operating system 102. To implement this, the additional files are filtered or blocked between processes in host operating system 104 and container operating system 102. In FIG. 2, the filtering component that implements this is illustrated as file filter driver 202.

In some embodiments have the ability to register and track trusted applications. When a trusted application is launched, the application attributes including process ID are dynamically tracked and provided to file filter driver 202. This may be implemented by HVSI monitor 204, HVSI manager 208 or another operating system component.

Note that in some embodiments, the HVSI monitor 204 has an interface that enables new components and/or applications to request unfiltered M. When the HVSI monitor 204 gets such a request, it checks various file characteristics to determine if it is trusted. These characteristics may include the origin of the application or component, the digital signature of the application or component, etc. The HVSI monitor 204 then monitors process launch. For this list of trusted applications and components if one of them is started, the HVSI monitor 204 derives the associated process ID and gives it to the filter driver. When the process is terminated, the HVSI monitor 204 removes this process ID and provides the update to the filter driver.

For the path noted in #1, the threat is perceived low because the user is trusted, it is receive-only (in filter code), and abuse, such as taking control of the port, just degrades the user experience—it does not open a vulnerability. For #2, this communication poses a significant risk. Some embodiments may remove the communication in #2 and instead read process information and monitor process creation and deletion from Kernel mode using the file filter driver.

In some embodiments there is a monitoring service to ensure that files are opened in the appropriate location. This component may have additional monitoring capabilities that are beyond the scope of this specification. In FIG. 2, this is illustrated as HVSI monitor 204.

The file filter driver 202 attaches to all drives and intercepts I/O operations monitoring for request types such as CreateFile( ) and/or OpenFile( ). File create/open requests directed at untrusted files are terminated with ACCESS_DE-NIED during the filter driver's pre-operation callback. When a create/open request is terminated due to it being an untrusted file, the file filter driver 202 sends the target pathname and the process ID of the caller to the hardware-based virtualized security isolation (HVSI) monitor 204 via FltSendMessage( ). Note that the HVSI monitor 204 component may be implemented as an executable, a monitoring service or as a part of an operating system.

In some preferred embodiments, applications are enlightened to understand the notion of trusted files and the isolated execution environment. In this approach, the host operating system 104 will provide APIs accessible by the applications to verify trust level of a file as well as an API accessible by the applications to launch a file in the secure environment (e.g., the container operating system 102). Enlightened applications can use these APIs to determine if a file is untrusted and if so, call the API to open the file in the isolated execution environment.

For unenlightened applications, upon receiving notification (e.g., via FilterGetMessage( ) in the illustrated example) of a create/open request, the HVSI monitor 204 examines the context of the open/create attempt and decides if additional action is needed. By keeping the heuristic based decision making within the HVSI monitor 204, Kernel mode complexity in the filter driver is reduced. Heuristics include ignoring calls from certain processes such as Shell, ignoring operations that occur in quick succession, etc. By "ignoring" it is meant that the user interface won't pay attention to these calls, yet the filter driver 202 does (and already had terminated the original call with ACCESS_DENIED).

If it is determined that this request is coming from the API to launch untrusted files in the isolated environment it will let the file access proceed. Otherwise, if it appears that this is a user request to open a file, the HVSI monitor 204 will produce an alert, such as a top-level system modal dialog box asking if the user would like to open the untrusted file in the HVSI container.

If the user clicks OK (or otherwise indicates that the user would like to open the untrusted file), then the HVSI monitor 204 calls LaunchInHVSI( ) 206 with the already supplied pathname that has been modified to be in tsclient format. The API LaunchInHVSI( ) 206 is not protected and can be called by anyone with the correct linkage. This means that even trusted files could be opened in the container operating system 102. Optionally embodiments can check if the file is trusted and block it if needed from opening in the container operating system 102. In some embodiments, the trusted files are encrypted). This may be implemented using Windows Information Protection (WIP) or some other method. In this case, embodiments can detect them and not open them in the container operating system 102. There are two important notes here: 1) if/when that trusted file is written back by container operating system 102, it will be definitively marked as untrusted by a trusted broker on the host operating system 102, and; 2) this API can be hardened (pursuant to limitations of user account executing from within), such as to verify that the file is untrusted.

In some embodiments there is a management service to provide a more seamless user and/or application experience between host operating system 104 and container operating system 102. In FIG. 2, this is illustrated as HVSI Manager 208. HVSI Manager 208 has the ability to read/write untrusted files. For a seamless user experience, applications may require read/write access to untrusted files. In some embodiments, this is achieved by having the HVSI monitor 204 send (e.g., via FilterSendMessage( ) as illustrated in the example) a list of bypass process identifiers. This is not secure from two perspectives: 1) this is a user ACLed component transferring the process IDs, and; 2) the process name is the sole determinant of which process ID to bypass untrusted checks.

The HVSI manager 208 may be similar to existing container or virtual machine management software, but with some functionality added to create a special HVSI alternate file stream in each file persisted from an HVSI container operating system. When the HVSI Manager 208 receives data to be written out to a host file in the host file system 106, it writes that data by calling a data writing function such as, in the illustrated example, W32DrDeviceAsync::AsyncWriteIOFunc( ) which, in the illustrated example, is in mstscax.dll loaded into the HVSI Manager process. By modifying W32DrDeviceAsync::AsyncWriteIOFunc( ) embodiments call CreateFile( ) to create and re-create a special alternate file stream that marks files as untrusted. The untrusted stream is created prior to each and every WriteFile( ). If the untrusted stream cannot be created, W32DrDeviceAsync::AsyncWriteIOFunc( ) terminates early (WriteFile( ) is not called) with an ACCESS_DENIED error.

In some embodiments there is an operating system shell that provides a user interface. In some embodiments this is improved and/or extended to provide a more seamless user and/or application experience between host operating system 104 and container operating system 102. In FIG. 2, this is illustrated as HVSI shell extension 210.

In one particular implemented embodiment the untrusted stream is named "949E25FE-1399-4B7C-96A8-9C5091C173BB" which is the same GUID as the HVSI Shell Extension. A GUID was selected to minimize the risk of collision with some other entity's alternate file stream. In some embodiments, the stream itself is empty for the following reasons: 1) writing data into the stream does not improve security; 2) any data written/read would increase I/O operations, and; 3) any data written would increase space consumption by at least one block per untrusted file.

The HVSI file filter driver 202 intercepts I/O operations and prevents users from removing the alternate file stream that marks files as untrusted. Administrators can make files trusted by removing the alternate file stream that marks files as untrusted. As a convenience, the HVSI Shell Extension 210, in some embodiments, provides this capability with a simple context menu command and automatically sends them to be trusted file(s) to a malware scanning application such as Windows Defender available from Microsoft Corporation of Redmond, Wash. for malware scanning.

In other embodiments, embodiments use an Extended Attribute (EA) to mark the file as untrusted. This, in combination with a file system filter driver can ensure that user mode code cannot directly remove the EA. In addition, a tamper proof API is provided for enlightened applications to call in order to mark a file as trusted and this will allow the system to audit these changes to the security log.

Untrusted data is written by, in the illustrated example, W32DrDeviceAsync::AsyncWriteIOFunc( ) in plaintext form. If there is malware in the data it may not be immediately known. Untrusted data is read by W32DrDeviceAsync::AsyncReadIOFunc( ). As noted earlier, as part of converting an untrusted file to trusted, a malware scanning application can be called upon to scan the file. If malware crosses into the HVSI Manager 208 via file persistence I/O or by some other signaling or data transport and can achieve execution, the malware will be able to act with the same privileges as the local user. These functions that handle writing and reading untrusted data will be verified from a threat model and pen test perspective.

In the illustrated example using a file navigation tool, such as File Explorer available from Microsoft Corporation of Redmond, Wash., embodiments may provide two right-click context menu items (or other user interface elements) to convert files to/from trusted/untrusted files. That is, embodiments may include functionality to toggle files between trusted and untrusted. Files that have been converted to trusted are then automatically handed over to diagnostic software such as Windows Defender via SendMessage (WM_COPYDATA) for scanning. Note that Windows Defender is used in the illustrated example, but this may be could be sent to another malware detection product. In some embodiments this file may not be sent and alternatively a file pointer may be provided. If Windows Defender is not already loaded and running, the HVSI Shell extension 210 launches it first. If Windows Defender cannot be found or for some reason returns an error result, the target files will be converted back to untrusted. Note that in some embodiments, the diagnostic software may be running as a server or cloud service that is not part of host operating system 104.

Operating system file filter drivers such as file filter driver 202 can attach to all volumes and intercept any or all I/O operations before they commence and/or after they complete. The HVSI file filter driver attaches to all volumes and intercepts a subset of IRP_MJ_* commands.

The filter driver 202 uses FltCreateCommunicationPort( ) to create a communications port to send and receive user mode messages. Messages are sent to user mode with FltSendMessage( ). Messages are received from user mode via the callback that was supplied to FltCreateCommunicationPort( ).

For intercepted commands (such as IRP_MJ_CREATE), the original caller's process ID is checked against a list of bypass process IDs. If the caller's process ID is in the bypass list, the call proceeds down the stack unaltered. This is how the HVSI Manager and Outlook can read and write untrusted files. As noted there may be security ramifications to this bypass capability. However, these ramifications may be acceptable due to UX requirements.

For intercepted commands that do not originate in a special bypass caller such as the HVSI Manager, the filter driver checks for the presence of the HVSI untrusted alternate file stream via FltCreateFile( ). If the untrusted alternate file stream is present, then the command is terminated with ACCESS_DENIED in the pre-operation callback as noted earlier in the discussion of the HVSI monitor 204. Additionally, the caller's process ID and target pathname are sent to the HVSI monitor 204 via FltSendMessage( ).

File Manipulations

There are three guiding principles that may be used in designing the guest and host file manipulations:

1. File operations are presented and authorized by the user.

2. Data is not cached in the guest (e.g., container operating system) before it is saved to the host (i.e., host operating system).

3. The file system of the host is not exposed to the guest.

Note that these are guiding principles and are not absolutes. For example, certain trade-offs can be made to facilitate other functionality. For example, as will be illustrated in more detail below, there may be situations where it is desirable to store data in the container operating system 102 before saving it to the host operating system 104.

The following now illustrates a number of file manipulations that may be performed within the context of certain embodiments of the invention illustrated herein.

Host Open File

Figure 3:
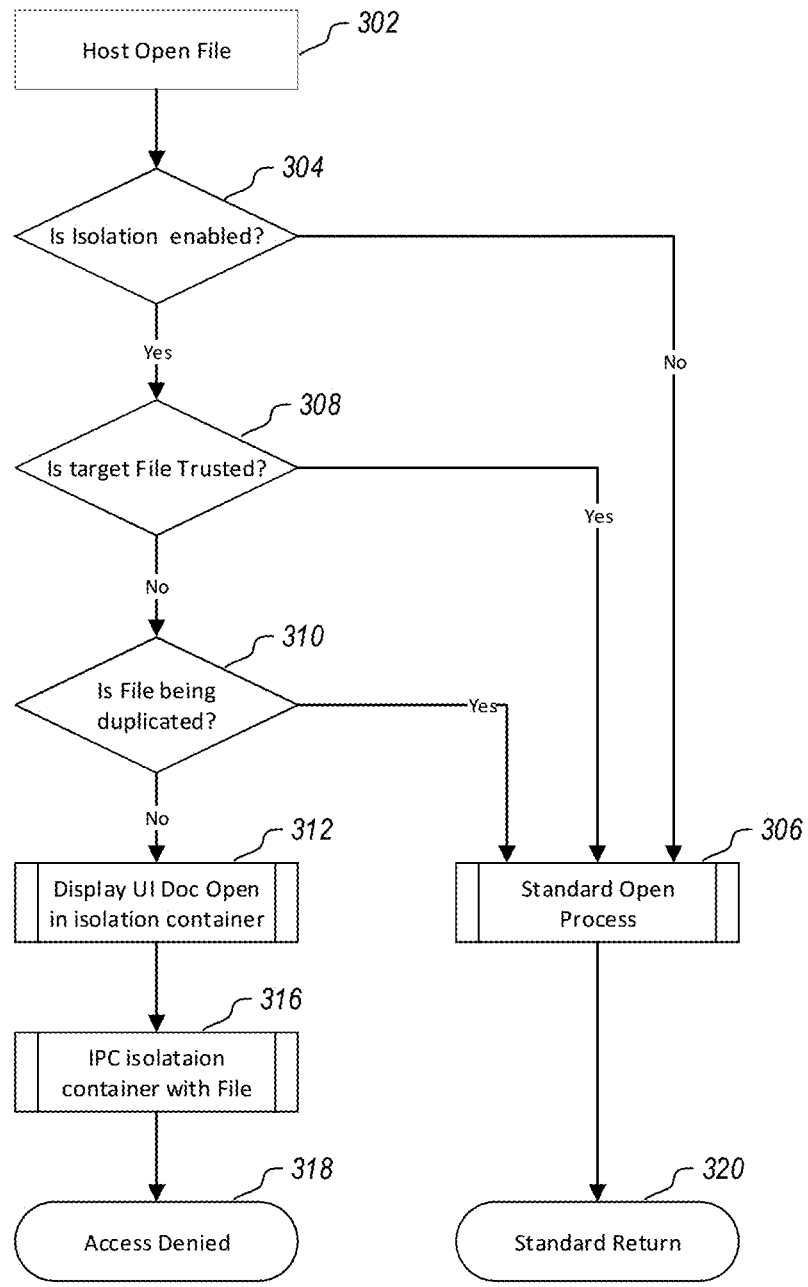
FIG. 3 illustrates a method for causing a file to be opened safely.

Referring now to FIG. 3, an example of a host operating system opening a file is illustrated. The following is in the host local user context. As illustrated at 302, the host operating system 104 receives an indication from the user that the user would like a file opened on the host operating system 104. For example, the user may indicate through a user interface, such as a dialog box, that the user wishes the file to be opened. In some embodiments this may be based on the user using the interface directly in the host operating system 104 or may be based on the host operating system 104 streaming the user interface to the container operating system 102 where the user interacts with the user interface. The file can be opened for other scenarios to show the metadata of the file to the UI, such as type of file, content of the file etc. For the enlightened apps and system apps, like File Explorer, based on the calling application or the action for which the file is being opened, embodiments can either allow or deny the action based on the if the action is secure (like reading the file extension) or insecure (like needing parsing of the untrusted file itself) Other embodiments may use a command shell to indicate that a file should be opened.

As illustrated at 304, a check is made to determine if isolation is enabled on the computing system 100. For example, a check may be made to determine if WDAG in Windows is running on the computing system 100 or if some other container isolation mechanism is running on the computing system 100. If isolation is not enabled, then the host operating system 104 will simply open the file at the host operating system 104 as illustrated at 306 and perform a standard return 320. This could be an open process that exists in current legacy devices.

If isolation is enabled on the computing system 100, then a further check 308 is performed to determine if the target file is trusted. If the target file is trusted, then the file is opened using the standard open process as illustrated at 306. In some embodiments the check performed at 308 may check multiple trust levels and/or trust criteria to determine if the target file is trusted.

If the file is simply being duplicated, then the standard open process 306 can be performed (which in this case is simply a duplication process which does not require the computing system 100 to interpret the contents of the file in any way but simply copy the bits over as they are). In addition to copying the bits of the file embodiments also maintain any of the metadata, file attributes, MOTW, ACLs, and any other EAs.

Figure 4:
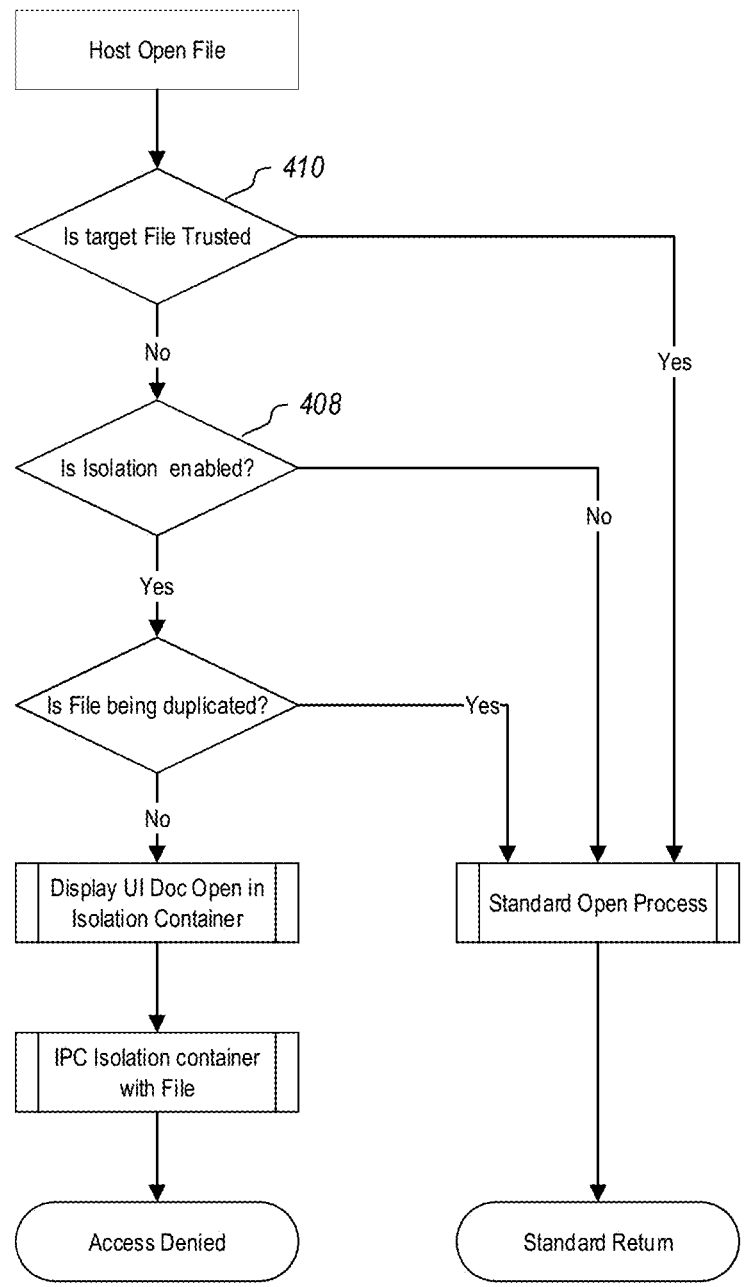
FIG. 4 illustrates another method for causing a file to be opened safely.

If isolation is enabled, the target file is trusted, and the file is not being duplicated, then as illustrated at 312 an API optionally displays a user interface element which prompts the user to indicate whether or not they would like the file opened in an isolation container, such as the container operating system 102. Note that while in the example illustrated checks are made to determine if isolation is enabled, if the target file is trusted, and if the target file is being duplicated, it should be appreciated in other embodiments that other sets of checks can be made and that different orderings of the checks can be performed than what is illustrated in FIG. 3. Thus, the example illustrated in FIG. 3 should not be interpreted as being definitive of how all embodiments of the invention are implemented indeed, FIG. 4 illustrates an alternative example that will be discussed in more detail below. Nonetheless, it should be appreciated that the checks illustrated in FIG. 3 may not be needed for certain systems, and different checks may be needed for other systems. For example, in a system that is only able to function with isolation enabled, there is no need to determine if isolation has been enabled. This can be assumed to be the case. In another example, some systems may not allow duplication (or other file manipulations). In these systems, there may be no need to determine if a file is being duplicated.

Returning once again to the example illustrated in FIG. 3, in the illustrated example, a user can indicate that the file should be opened in the container operating system 102. This causes the file to be opened in the container operating system 102 IPC to be used to communicate the contents of the file, as illustrated at 316. Additionally as illustrated at 318 access to the file is denied to the host operating system 104.

In some embodiments, one of the applications 108-1 and/or applications 108-2 will create a new file. Some embodiments will use one or more attributes to determine the trust level of the new file, for example, the trust level of the container, the trust level of the application, the user identity, etc. In some embodiments, this new file will be created for a less secure operating system. In this case, the trust level of the new file may be determined by the attributes in the destination (e.g. the trust level of the destination container, the trust level of the receiving user identity, etc.).

In some embodiments, a file is being accessed that has a higher or lower trust level than the operating system or application would permit. This may occur in embodiments that allow access to files of varying levels of trust. This may occur due to one of the applications 108-1 or applications 108-2 accessing a file and receiving a policy update that changed the trust level before that file was written or copied. When this occurs, file operations (e.g. write, copy, etc.) are updated to reflect the current attributes (e.g. the trust level of the container, the trust level of the application, the user identity, etc.).

In some embodiments, the filesystem will support an undelete operation. Some filesystems will track and re-mark all undeleted files with their previous attributes and trust levels. Some filesystems will re-mark undeleted files with new attributes and trust levels based on results from diagnostic software, or other analysis.

FIG. 4 illustrates an alternative example which demonstrates that the order of checks can be implemented differently in different embodiments. In particular, FIG. 4 illustrates that in some embodiments, a check can be made to determine if the target file is trusted as illustrated at 410 prior to determining if isolation is enabled as illustrated at 408. In particular, if it is known that a target file is trusted, there may be no need to even determine if isolation has been enabled, as isolation would not be needed.

Guest Open File

Figure 5:
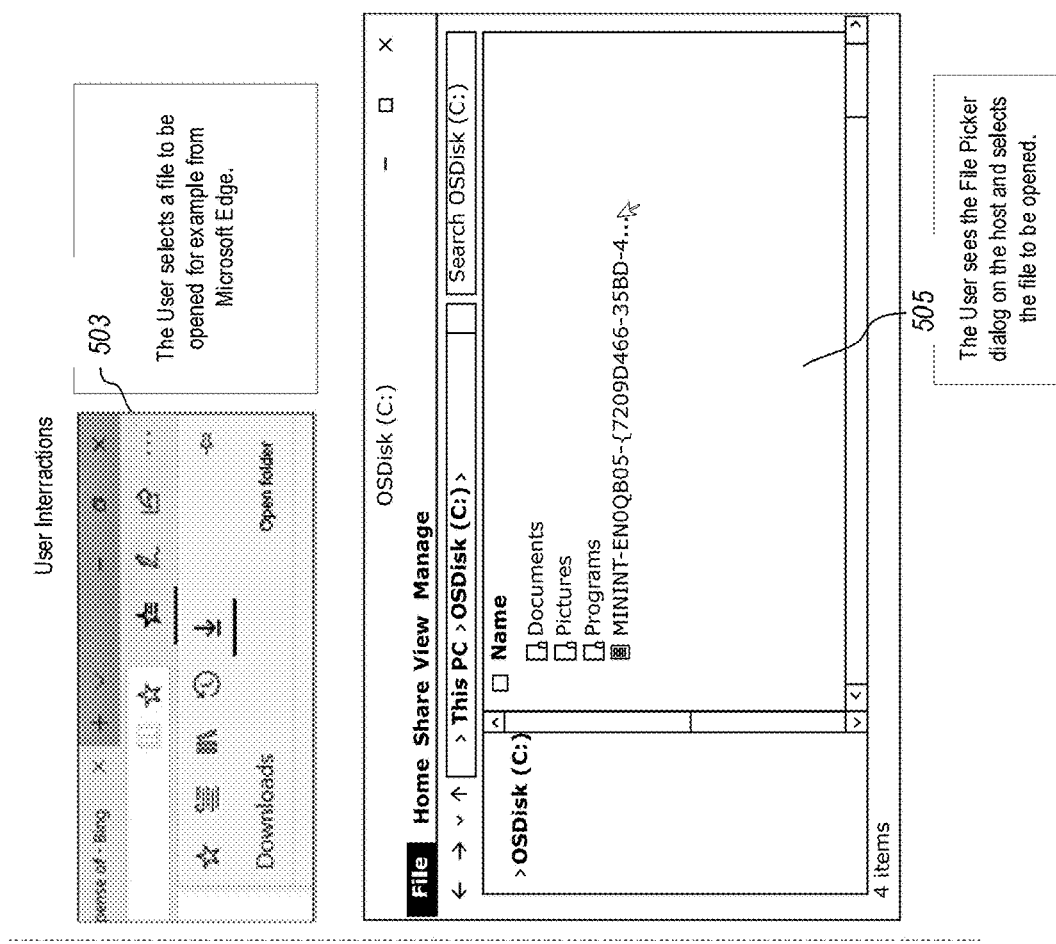
FIG. 5 illustrates another method for causing a file to be opened safely.
Figure 5:
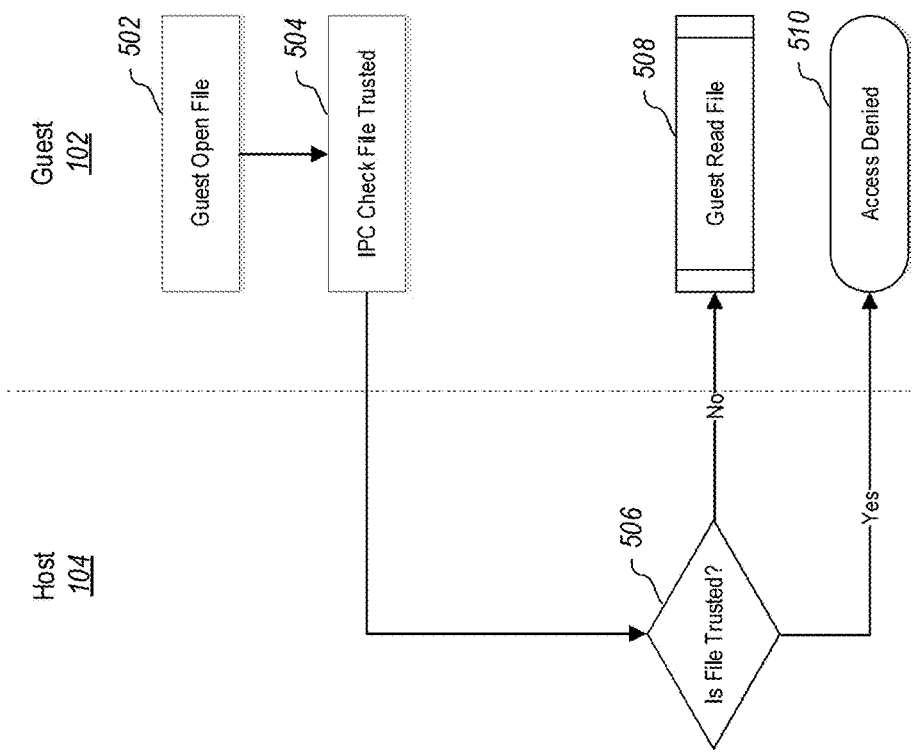

The following now illustrates details regarding another file manipulation, namely, the guest operating system opening a file. FIG. 5 illustrates at 502 that the container operating system 102 receives an indication that a file should be opened. For example, this may occur as a result of the user selecting a file to be opened such as is illustrated in the user interface element 503. While this example uses the Microsoft Edge browser as an example, it could be any application or utility for opening files. As illustrated at 504, an IPC call is used to initiate a check from the container operating system 102 to the host operating system 104 to determine if the file is trusted. As illustrated at 506 the host operating system 104 performs a check to determine if the file is trusted. If the file is not trusted, the container operating system 102 will read the file as illustrated at 508. If the file is trusted, then as illustrated at 510, access is denied to the container operating system 102. In particular, access is denied, as the host operating system 104 is able to open the file safely.

When the container operating system opens a file, the host operating system will verify that the file is untrusted else it will return Access Denied. This logic is used because, in some embodiments, only untrusted files should be opened in the container operating system. The example illustrated is in the host local user context.

Note that FIG. 5 further illustrates a user interface 505. In this example, the user sees the file picker user interface 505 dialogue on the host operating system 104 and selects the file to be opened. However, note that in other embodiments, the host may stream information about the file stored on the host operating system 104 to the guest operating system 102 where the user can select the file to open. In this context, it should be noted that although the file appears in the file system 106 of the host operating system 104, the file is not necessarily stored directly on the host operating system 104. In particular, the file may be stored on a network store, an SMB share, or in another appropriate location.

Guest Read File

Figure 6:
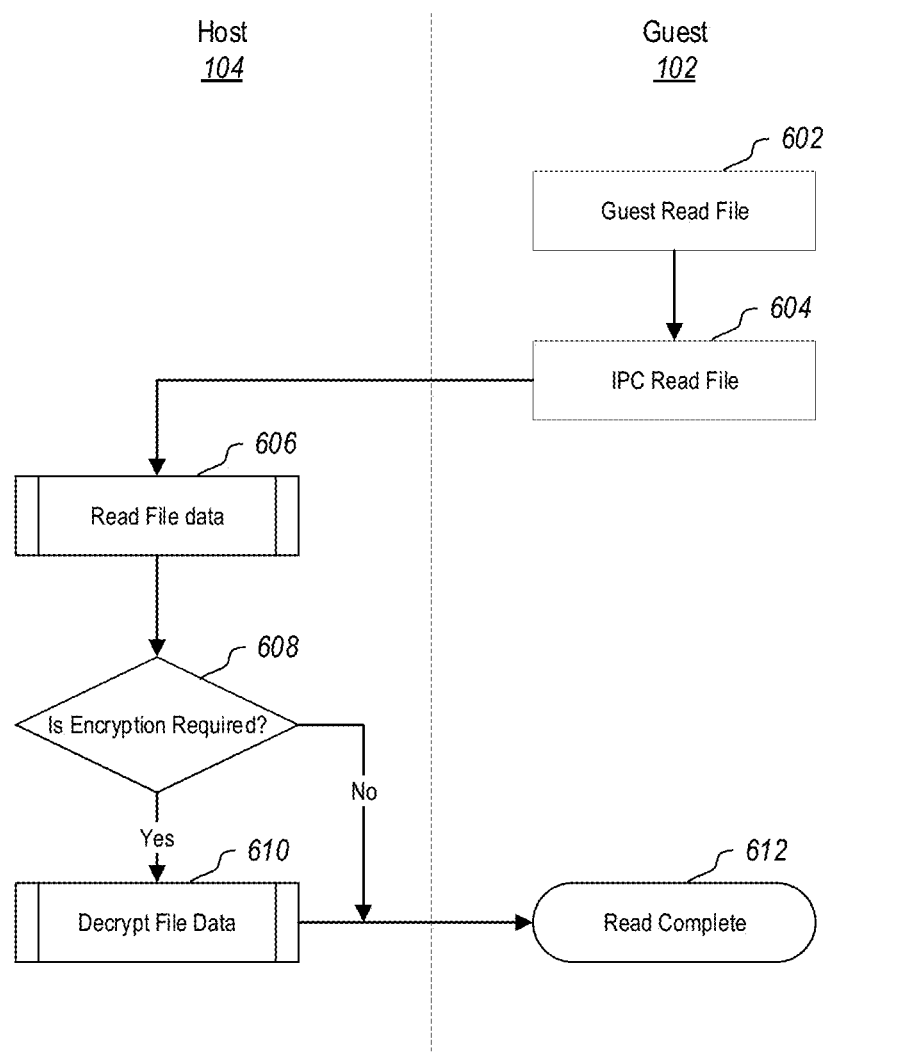
FIG. 6 illustrates a method for causing a file to be read safely.

Referring now to FIG. 6, a file manipulation where a Read starts in the container operating system 102 context and transitions to the host operating system 104 and back is illustrated. As illustrated at 602, an indication is received at the container operating system 102 that a file should be read by the container operating system 102. The container operating system uses an IPC call to request that the host operating system 104 read the file as illustrated at 604. As illustrated at 606, the host operating system 104 begins a process of reading the file data. At 608, the host operating system 104 performs a check to determine if encryption is required for the file. For example, as discussed above, some systems may include encryption as a protective measure preventing malicious files from infecting or affecting computing systems. However, encryption may be required for any one of a number of other different reasons. The example illustrated herein allows a guest to read an encrypted file when the guest does not have the appropriate keys or other authorization to decrypt the file. As illustrated at 610, if encryption is required, then the host operating system 104 will decrypt the file data and pass this information back to the container operating system 102 which will complete the read of the file data as illustrated at 612. Note that some embodiments may use alternative or additional functionality beyond encryption such as file compression, file de-duplication, data conversion, etc.

Guest Write File

Figure 7:
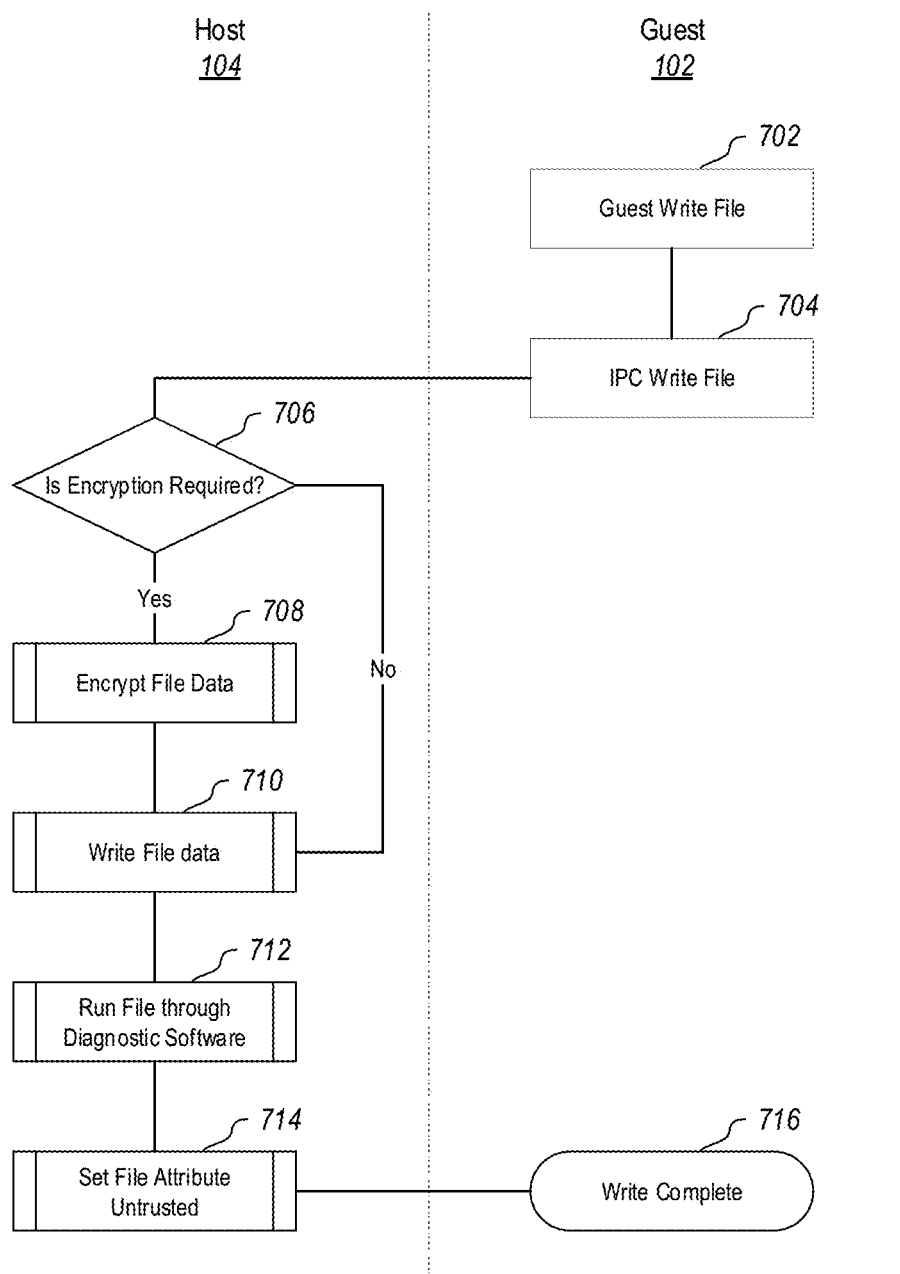
FIG. 7 illustrates a method for causing a file to be written safely.

Referring now to FIG. 7, an example of a file manipulation where a Write starts in the container operating system context and transitions to the host operating system and back is illustrated. In this example the container operating system 102 receives an indication as indicated 702 that the container operating system 102 should write a file. As illustrated at 704, the guest operating system 102 makes an IPC call to the host operating system 104 indicating that the file should be written. In the example illustrated in FIG. 7, encryption may be available for the host operating system 104. Thus, in this particular example, a check is made at illustrated at 706 see if encryption is required for the file. This encryption may be required due to security reasons to prevent the file from performing malicious actions on a computing system or for other purposes. If encryption is required, then as illustrated at 708 the host operating system 104 encrypts the file data and then writes the file data as illustrated at 710. Note that some embodiments may use alternative or additional functionality beyond encryption such as file compression, file de-duplication, data conversion, etc. At 712 the host operating system 104 runs the file through diagnostic software. Running the written file through diagnostic software may include one or more of a number of different actions. For example, in some embodiments, the file system could cause the file to be checked by an anti-malware checker to determine whether or not the file data includes malware. Alternatively or additionally diagnostic software may be configured to determine if the file meets the appropriate trust characteristics (e.g. the file is appropriately signed, the file meets a certain set of patterns, the resource the file originated from is authentic, etc.). Alternatively or additionally diagnostic software may be configured to determine whether or not the hash of the file is known in a malicious hash list maintained by antivirus and file reputations sites. In an Enterprise environment, this function can be implemented with a set of trusted tools configured by the Enterprise administrator.

FIG. 7 further illustrates that a file attribute indicating the file is untrusted is set for the file as illustrated at 714. This may be performed as a result of the file write operation having begun at the container operating system 102. Thus, in some embodiments, any write operation initiated by the container operating system 102 may cause files written to during those operations to be marked as untrusted. However, it should be appreciated that in other embodiments, diagnostic software and or corrective software may be able to perform operations on the file such that it can be determined that the file should be trusted which would allow the file to be opened on the host operating system 104. Thus in alternative examples not illustrated in FIG. 7, certain actions can be performed to ensure that the file is trustworthy or to cause file to have changes made to make the file trustworthy such that it can have an attribute of trusted applied to it. As illustrated at 716 the write processes completes and a return is made to the container operating system 102.

Figure 8:
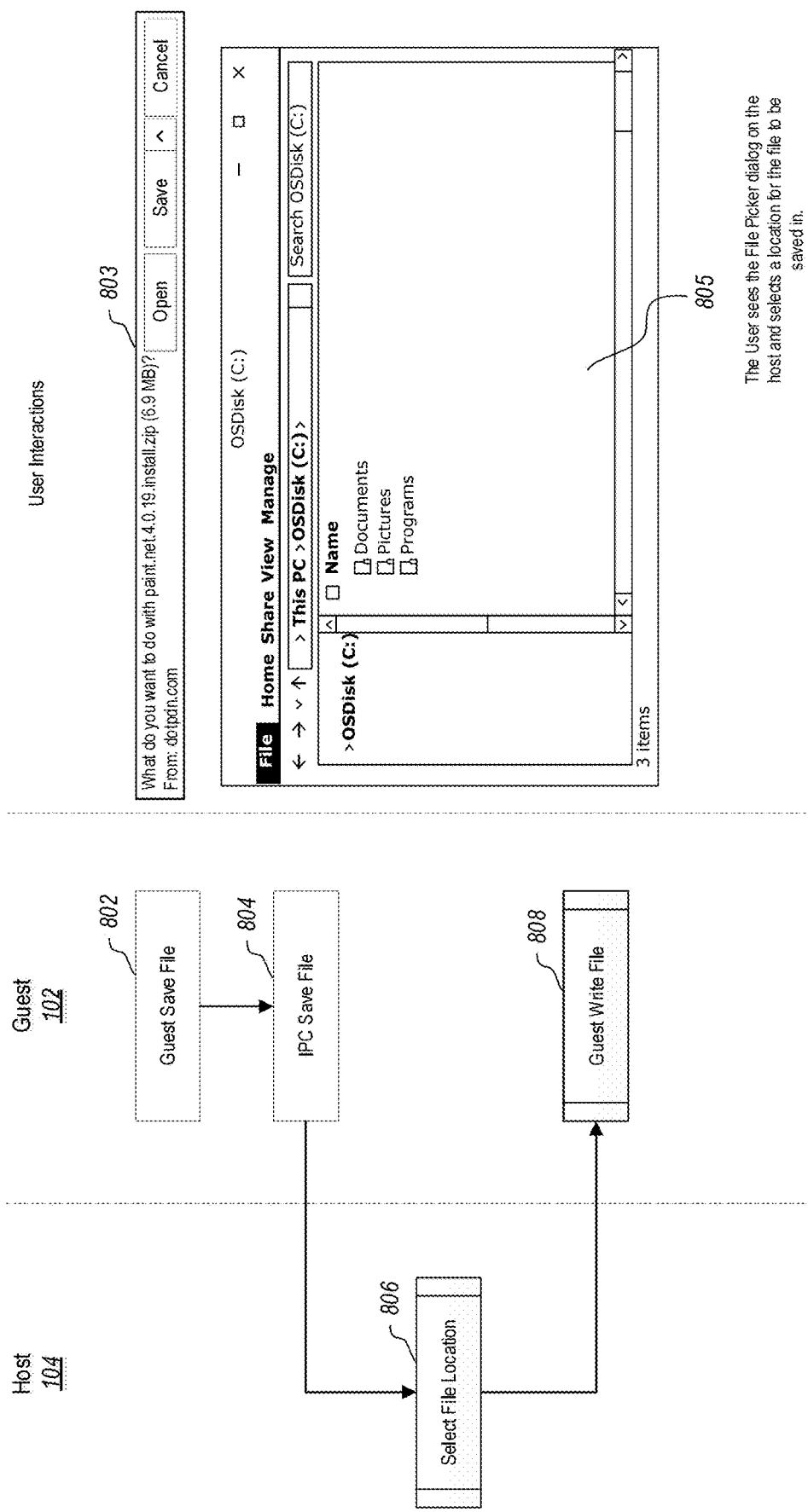
FIG. 8 illustrates a method for causing a file to be saved safely.

In some embodiments, the container operating system 102 may be able to directly save a file to the host operating system 104. An example of this is illustrated in FIG. 8. FIG. 8 illustrates that an indication is made at the container operating system 102 to save a file as illustrated at 802. The container operating system 102 sends an IPC call as illustrated at 804 indicating that a file is to be saved. Using an API at the host operating system 104 the user is able to select a file location as illustrated at 806 where the file should be saved. In particular attention is directed to user interface element in 803, which might be shown to a user as the user interacts with an application, such as a browser where there is a desire to save a file from browser (where the browser is running in the container operating system 102 as one of the applications 108). In the user interface 805 the user uses a file picker dialog to select a location on the host operating system 104 where the file will be saved. As illustrated in FIG. 8, the container operating system 102 then uses an API to directly write the file as illustrated at 808. In this case the file would be marked as untrusted as the host operating system 104 has no way of verifying the trust status of the file.

Figure 9:
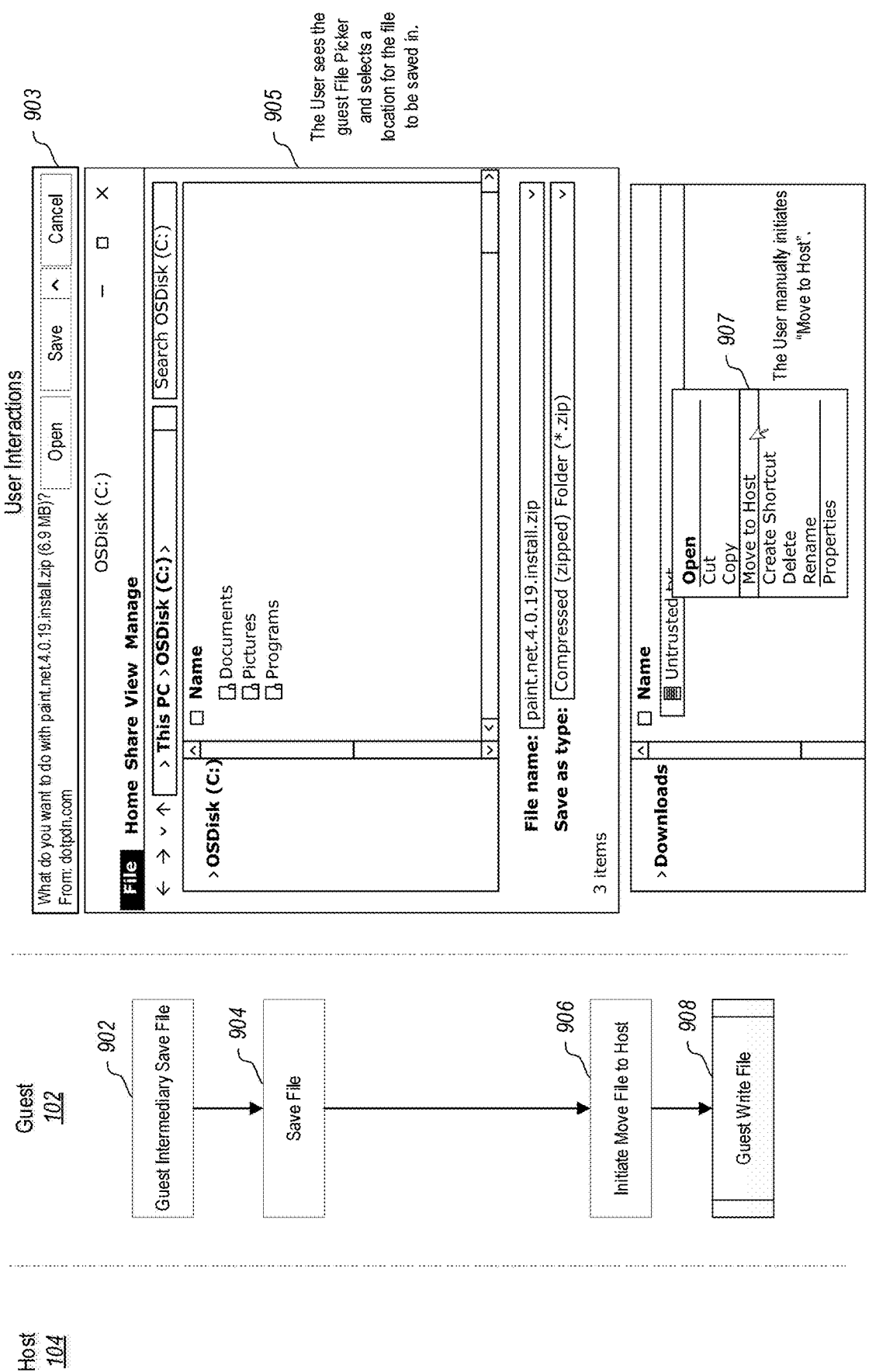
FIG. 9 illustrates another method for causing a file to be saved safely.

An alternative example is illustrated in FIG. 9 where a container operating system 102 saves the file on the container operating system 102 (or at least in a file system for the container operating system 102) and initiates a move of the saved file to file system 106 of the host operating system 104. Notably, this may be less desirable in some embodiments as it creates an opportunity for an infected guest operating system to infect files that will then be stored on the host operating system. Nonetheless, some embodiments may allow for this functionality to be performed. In the example illustrated in FIG. 9, the container operating system receives an indication that a file should be saved as illustrated at 902. For example, as illustrated in the user interface elements 903, a user may be presented with a dialog box where the user can indicate a desire to save the file. As illustrated at 904 the container operating system 904 saves the file to the guest operating system 102. As illustrated at 905, a file picker user interface element can be used to select a location on the container operating system 102 where the file should be saved. The user can then manually initiate a move operation to move the file from the container operating system 102 to the host operating system 104 as illustrated at 906. As illustrated by the user interface elements 907, a user can manually initiate a move operation of a file to the host operating system 104. The container operating system 102 uses an API to write the file to the host operating system 104 as illustrated at 908.

Figure 10:
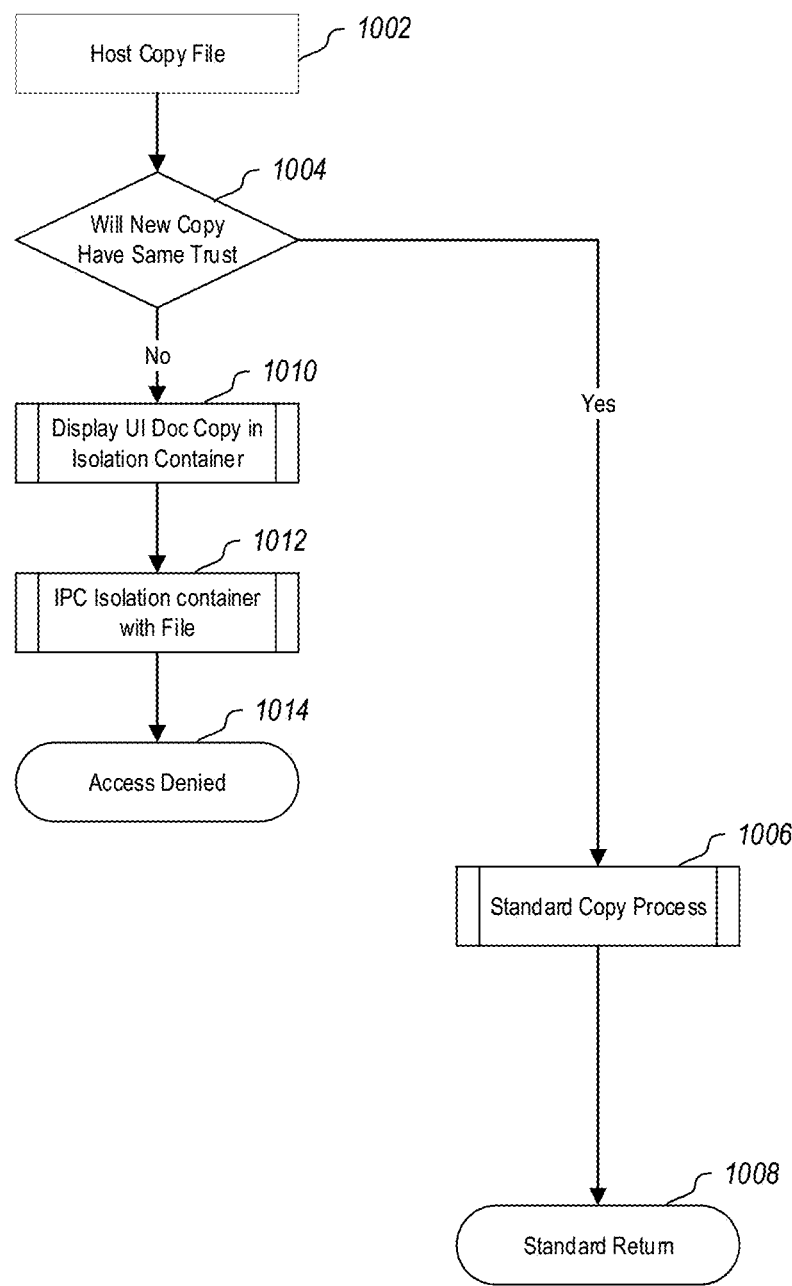
FIG. 10 illustrates a method for causing a file to be copied safely.

FIG. 10 illustrates an example of during interception of a file access, automatically allows a file-copy request based on a determination that the file-copy request will result in the new copy of the file having the same trust status as the original file. In particular, FIG. 10 illustrates at 1002 that a host operating system 104 receives a request to copy a file. At 1004 a determination is made as to whether or not the new copy of the file will have the same trust level as the file to be copied. If the new copy of the file will have the same trust level as the copy file to be copied, then as illustrated at 1006 a standard copy process is performed at the host operating system 104. As illustrated at 1008 a standard return is performed. If the new copy of the file will not have the same trust as the file to be copied, then as illustrated at 1010 embodiments may display a user interface element in an isolation container, such as the container operating system 102 which allows the user to indicate that the file should be copied in the isolation container. Additionally an IPC call will be made to the isolation container with the file for the isolation container to copy the file as an un-trusted file, as illustrated at 1012. As illustrated at 1014 access is denied to the host operating system 104.

Figure 11:
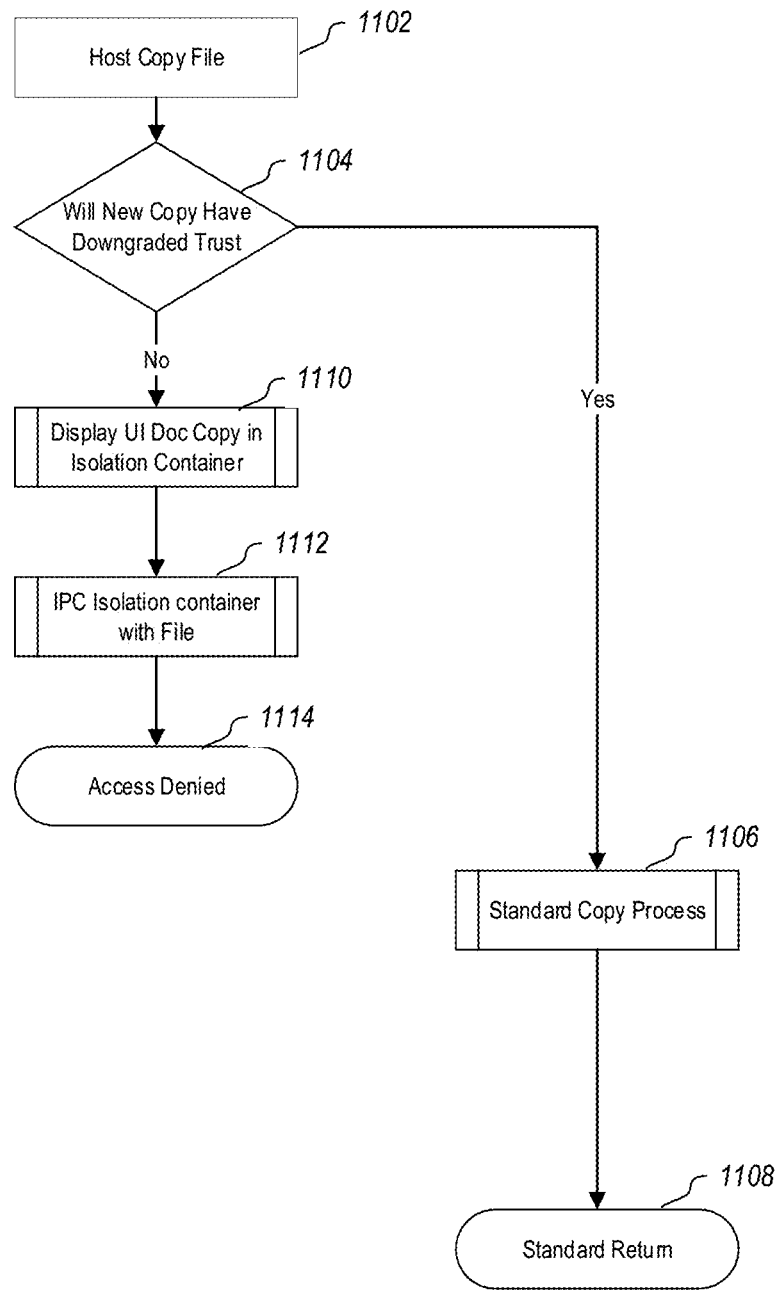
FIG. 11 illustrates another method for causing a file to be copied safely.

FIG. 11 illustrates an example of during interception of a file access, automatically allows a file-copy request based on a determination that the file-copy request will result in the new copy of the file having a downgraded trust status compared to the original file. In particular, FIG. 11 illustrates at 1102 that a host operating system 104 receives a request to copy a file. At 1104 a determination is made as to whether or not the new copy of the file will have a lower trust level than the file to be copied. If the new copy of the file will have a lower trust level than the copy file to be copied, then as illustrated at 1106 a standard copy process is performed at the host operating system 104. As illustrated at 1108 a standard return is performed. If the new copy of the file will not have a lower trust level than the file to be copied, then as illustrated at 1110 embodiments may display a user interface element in an isolation container, such as the container operating system 102 which allows the user to indicate that the file should be copied in the isolation container. Additionally an IPC call will be made to the isolation container with the file for the isolation container to copy the file as an un-trusted file, as illustrated at 1112. As illustrated at 1114 access is denied to the host operating system 104.

Figure 12:
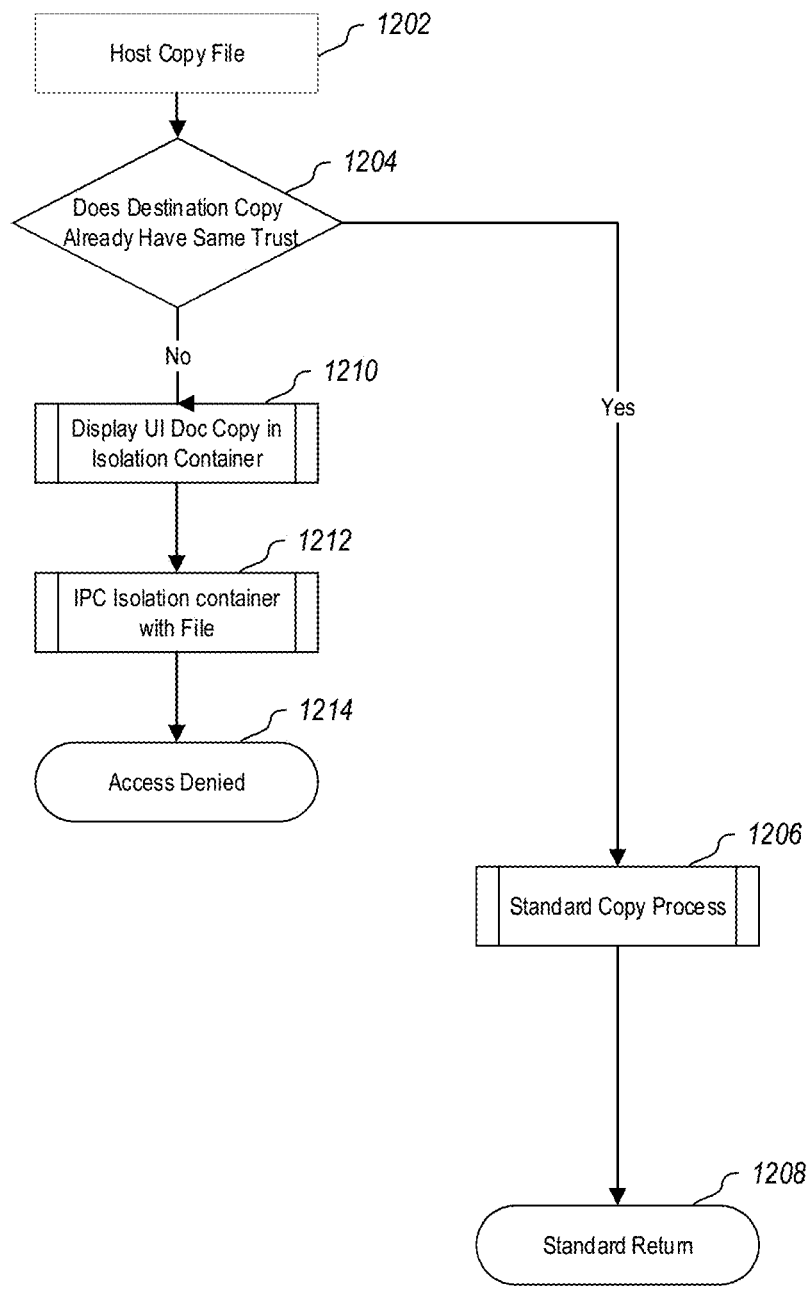

FIG. 12 illustrates an example of during interception of a file access, automatically allows a file-copy request based on a determination that destination file already has a same trust status as the original file. In particular, FIG. 12 illustrates at 1202 that a host operating system 104 receives a request to copy a file. At 1204 a determination is made as to whether or not the new copy of the file already has the same trust level (or in some embodiments, a lower level) as the file to be copied. If the new copy of the file already has the same trust level as (or a lower level than) the copy file to be copied, then as illustrated at 1206 a standard copy process is performed at the host operating system 104. As illustrated at 1208 a standard return is performed. If the new copy of the file does not have the same trust level as (or a lower trust level than) the file to be copied, then as illustrated at 1210 embodiments may display a user interface element in an isolation container, such as the container operating system 102 which allows the user to indicate that the file should be copied in the isolation container. Additionally an IPC call will be made to the isolation container with the file for the isolation container to copy the file as an un-trusted file, as illustrated at 1212. As illustrated at 1214 access is denied to the host operating system 104.

In another embodiment, during interception of a file access from an untrusted process that would modify file data, the embodiment ensures the file is marked as untrusted prior to allowing the modification of the file data.

Some embodiments support, or at least take into account, transportability of trusted and un-trusted files across systems using various storage media. For example, such files may be transported via USB connectable drives, or other removable and transportable media. When a less trusted file is being transported to another device for consumption on another host secure computing system, a copy operation to the removable and transportable media preserves the lower trust marking of its files. When the removable and transportable media is connected to the host secure computing system, the markings will be available to the hosts secure computing system.

Alternatively or additionally in some embodiments, files from removable and transportable media may be prohibited on certain host secure computing systems. In particular, the host secure computing system may disallow files from external media that are subsequently connected to the host secure computing system from being copied to other media on the host secure computing system. In some embodiments, this can be controlled by enforcing predetermined policies indicating that files from removable and transportable media are not to be copied onto the host secure computing system. In some embodiments, files are centrally tracked and policy may enforce or allow specific file operations based on the identity of the file that resides on external media.

In the examples above, embodiments included a secure host, and a virtual machine or container as the isolated runtime. As noted above, embodiments could invert this by having a secure container implemented on an insecure host.

Alternatively or additionally, in a more complex system, embodiments could implement multi-tiered or spectral isolation. For example, files could have degrees, tiers, or other variable levels of trust rather than simply a binary trust applied. The trust, for example, could continuously or by tiers range from 'fully trusted' to 'dangerous' or 'malicious'. In one example embodiment, this variable trust could be done by taking into account file origin (e.g. what internet resource or "server" these files came from), what application created them, what environment created them, etc.

In some embodiments, this variable trust can be implemented with the same apps installed in a given container. Different containers can be used to handle files of varying risk levels. In some embodiments, system resources are conserved by activating a container (e.g. via pause/resume or boot) based on the trust characteristic of the file the user is trying to access and the associated app that must process it.

Some embodiments may be implemented with per-app isolation. For example, the isolated environments have one app only, but overall would function in the same manner as described above. Some embodiments include controls to tightly manage cross-app information sharing such as clipboard (copy/paste), and other cross-app information sharing.

Some embodiments may be used to implement content isolation. A user may trust one set of content (e.g. their personal files) differently from their enterprise content. These "islands of content" can be isolated from each other using the principles illustrated above.

Some embodiments may be used to implement cross-tenant content isolation. For example, an enterprise may implement a server/service topology to isolate content between various employees (e.g. security groups) or departments.

Further, the embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
 one or more processors; and
 one or more computer-readable media having stored thereon instructions that are executable by the one or more processors to configure the computer system to provide a host operating system and a container operating system isolated from the host operating system by a secure boundary, the one or more computer-readable media having additional instructions that are executable by the one or more processors to cause the computer system to securely perform file operations including:

receiving, at the container operating system, a request for performing a file operation on a file stored in the host operating system; and upon receiving the request, determining, at the host operating system, a trust level assigned to the file, the trust level representing a level of security threat to the host operating system from performing the requested file operation on the file;

in response to determining that the trust level assigned to the file meets or exceeds a predetermined trust threshold, performing the requested file operation on the file in the host operating system and denying access to performing the file operation in the container operating system; and in response to determining that the trust level assigned to the file does not meet or exceed the predetermined trust threshold, performing the requested file operation on the file in the container while preventing the file operation from being performed in the host operating system.

2. The computer system of claim 1, wherein the operation on the file comprises a copy operation of the file, and wherein the predetermined threshold comprises that the file to have the same trust level as a new copy of the file.

3. The computer system of claim 1, wherein the operation on the file comprises a copy operation of the file, and wherein the predetermined threshold comprises the file already having the same trust level as a new copy of the file.

4. The computer system of claim 1, wherein the operation on the file comprises a copy operation of the file, and wherein the predetermined threshold comprises that the file to have a lower trust level than a new copy of the file.

5. The computer system of claim 1, wherein performing the file operation on the file comprises writing the file to a file system on the host operating system.

6. The computer system of claim 1, wherein the instructions are executable to further configure the computer system to perform at least one of encrypting the file on the host operating system, de-duplicating the file on the host operating system, or performing a data conversion of the file on the host operating system.

7. The computer system of claim 1, wherein the instructions are executable to further configure the computer system to decrypt the file on the host operating system prior to performing the file operation.

8. The computer system of claim 1 wherein the instructions are executable to further configure the computer system to run the file through diagnostic software on the host operating system prior to performing the file operation.

9. A method performed in a computer having a processor and a memory containing instructions executable by the processor to provide a host operating system and a container operating system isolated from the host operating system by a secure boundary, comprising:

receiving, at the container operating system, a request for performing a file operation on a file stored in the host operating system; and upon receiving the request, determining, at the host operating system, a trust level assigned to the file, the trust level representing a level of security threat to the host operating system from performing the requested file operation on the file;

in response to determining that the trust level assigned to the file meets or exceeds a predetermined trust threshold, performing the requested file operation on the file in the host operating system and denying access to performing the file operation in the container operating system; and in response to determining that the trust level assigned to the file does not meet or exceed the predetermined trust threshold, performing the requested file operation on the file in the container while preventing the file operation from being performed in the host operating system.

10. The computer system of claim 9 wherein the operation on the file comprises a copy operation of the file, and wherein the predetermined threshold comprises that the file to have the same trust level as a new copy of the file.

11. The computer system of claim 9 wherein the operation on the file comprises a copy operation of the file, and wherein the predetermined threshold comprises the file already having the same trust level as a new copy of the file.

12. The computer system of claim 9 wherein the operation on the file comprises a copy operation of the file, and wherein the predetermined threshold comprises that the file to have a lower trust level than a new copy of the file.

13. The computer system of claim 9 wherein performing the file operation on the file comprises writing the file to a file system on the host operating system.

14. The computer system of claim 9, further comprising performing at least one of encrypting the file on the host operating system, de-duplicating the file on the host operating system, or performing a data conversion of the file on the host operating system.

15. The computer system of claim 9, further comprising decrypting the file on the host operating system prior to performing the file operation.

16. The computer system of claim 9, further comprising running the file through diagnostic software on the host operating system prior to performing the file operation.

17. A method performed in a computer having a processor and a memory containing instructions executable by the processor to provide a host operating system and a container operating system isolated from the host operating system by a secure boundary, comprising:

detecting a file operation request directed to a file stored in the computer is received in the container operating system; and upon receiving the request, determining, at the host operating system, a trust level assigned to the file by accessing metadata of the file, the trust level representing a level of security threat to the host operating system from performing the requested file operation on the file;

in response to determining that the trust level assigned to the file meets or exceeds a predetermined trust threshold, denying access to the container operating system for performing the file operation; and in response to determining that the trust level assigned to the file does not meet the predetermined trust threshold, preventing the file operation from being performed in the host operating system; and performing the file operation in the container operating system by exchanging data with the host operating system without exposing a file system of the host operating system to the container operating system.

18. The method of claim 17 wherein:
the file operation includes a file save operation directed to the file; and
performing the file operation in the container operating system includes communicating data of the file from the container operating system to the host operating system via an inter-process communication call; and
managing the received data of the file on the host operating system without exposing the file system of the host operating system to the container operating system.

19. The method of claim 17 wherein:
the file operation includes a file open operation directed to the file; and
performing the file operation in the container operating system includes communicating data of the file from the host operating system to the container operating system via an inter-process communication call; and
opening the received data of the file in the container operating system without exposing the file system of the host operating system to the container operating system.

20. The method of claim 17 wherein:
the file operation includes a file open operation directed to the file; and
in response to determining that the trust level assigned to the file meets or exceeds the predetermined trust threshold, performing the file operation in the host operating system includes:
opening the data of the file in the host operating system; and
preventing the file from being opened in the guest operating system.

* * * * *